United States Patent
Borup et al.

(10) Patent No.: US 11,034,457 B2
(45) Date of Patent: Jun. 15, 2021

(54) ICING CONTROL SYSTEM

(71) Applicant: UBIQ Aerospace AS, Trondheim (NO)

(72) Inventors: Kasper T. Borup, Trondheim (NO);
Tor A Johansen, Trondheim (NO);
Kim L. Sørensen, Trondheim (NO)

(73) Assignee: UBIQ AEROSPACE AS, Trondheim (NO)

( * ) Notice: Subject to any disclaimer, the term of this patent is extended or adjusted under 35 U.S.C. 154(b) by 209 days.

(21) Appl. No.: 16/326,762

(22) PCT Filed: Aug. 22, 2017

(86) PCT No.: PCT/EP2017/071172
§ 371 (c)(1),
(2) Date: Feb. 20, 2019

(87) PCT Pub. No.: WO2018/037022
PCT Pub. Date: Mar. 1, 2018

(65) Prior Publication Data
US 2019/0202568 A1 Jul. 4, 2019

(30) Foreign Application Priority Data
Aug. 22, 2016 (GB) .................... 1614339

(51) Int. Cl.
*B64D 15/22* (2006.01)
*B64D 15/12* (2006.01)
*B64C 39/02* (2006.01)

(52) U.S. Cl.
CPC ............ *B64D 15/22* (2013.01); *B64C 39/024* (2013.01); *B64D 15/12* (2013.01); *B64C 2201/00* (2013.01)

(58) Field of Classification Search
CPC ........ B64D 15/22; B64D 15/12; B64D 15/14; B64D 15/20; B64C 39/024; B64C 2201/00
See application file for complete search history.

(56) References Cited

U.S. PATENT DOCUMENTS 6,328,467 B1 12/2001 Keyhani
9,156,557 B2 10/2015 Penny et al.
(Continued)

FOREIGN PATENT DOCUMENTS

GB   1582673   1/1981

OTHER PUBLICATIONS

Sørensen et al, IFAC, vol. 48, Sep. 2015, Paris, Diagnosis of Wing Icing Through Lift and Drag Coefficient Change Detection for Small Unmanned Aircraft, 541-546.
Sørensen KL, Helland AS, Johansen TA. (2015). Carbon nanomaterial-based wing temperature control system for in-flight anti-icing and de-icing of unmanned aerial vehicles. IEEE Aerospace Conference Proceedings. 2015. 10.1109/AERO.2015.7119206.
(Continued)

*Primary Examiner* — Michael J Zanelli
(74) *Attorney, Agent, or Firm* — Duane Morris LLP; Gregory M. Lefkowitz

(57) ABSTRACT

Disclosed herein is a method for determining if icing has occurred on a surface of an aircraft, the method comprising: heating a surface of an air craft, after the heating has stopped, measuring the temperature of the surface as it cools, and determining if icing has occurred on the surface in dependence on the measured temperature. Advantageously, embodiments provide improved techniques for the detection of icing and the prevention, or mitigation, of icing when it has formed. Embodiments are particularly advantageous when implemented on small UAVs in civilian applications for which autonomous and energy efficient operation is particularly important.

12 Claims, 9 Drawing Sheets

(56) References Cited

U.S. PATENT DOCUMENTS

| | | | |
|---|---|---|---|
| 9,176,044 B2 | 11/2015 | Bosbach et al. | |
| 9,284,043 B2* | 3/2016 | Barbour | B64C 13/16 |
| 9,321,536 B2* | 4/2016 | Snir | B64D 15/16 |
| 9,400,227 B2 | 7/2016 | Ramos et al. | |
| 2006/0226292 A1* | 10/2006 | Houlihan | B64D 15/12 |
| | | | 244/134 R |
| 2011/0240621 A1 | 10/2011 | Kessler et al. | |
| 2012/0266669 A1 | 10/2012 | Sage | |
| 2014/0191084 A1* | 7/2014 | Gambino | B64D 15/12 |
| | | | 244/134 D |
| 2016/0009400 A1 | 1/2016 | English et al. | |
| 2016/0052634 A1* | 2/2016 | Almond | B64C 39/024 |
| | | | 701/10 |
| 2018/0002024 A1* | 1/2018 | Brelati | H05B 3/26 |

OTHER PUBLICATIONS

Sørensen KL, Borup KT, Johansen TA. (2016). Intelligent Icing Protection Solution for small unmanned aerial vehicles (UAVs). Autonomous Marine Operations and Systems (AMOS), Norwegian University of Science and Technology (NTNU).

Borup K, Fossen T, Johansen TA (2016). Self-Calibrating Air Data Parameter Estimator for small unmanned aerial vehicles (UAVs). Autonomous Marine Operations and Systems (AMOS), Norwegian University of Science and Technology (NTNU).

Sørensen Kim Lynge (2016). Intelligent Icing Protection Solution for Small Unmanned Aircraft: An Icing Detection, Anti-Icing and De-Icing Solution. Norwegian University of Science and Technology (NTNU), Autonomous Marine Operations and Systems (AMOS). ISBN 978-82-471-2896-1.

* cited by examiner

ICING CONTROL SYSTEM

CROSS-REFERENCE TO RELATED APPLICATIONS

This application is a § 371 national stage entry of International Application No. PCT/EP2017/071172, filed Aug. 22, 2017, which claims priority to Great Britain Patent Application No. 1614339.8, filed Aug. 22, 2016, the entire contents of which are incorporated herein by reference.

FIELD

The field of the invention is both the detection of icing formation on surfaces of an aircraft and the control of the heating of the surfaces when icing is detected. More particularly, a new icing control system is provided that allows accurate icing detection to be performed in an energy efficient manner. The heating of the surfaces is also controlled so that the removal of any icing formation is performed efficiently. A particularly advantageous application of the icing control system is in small unmanned aerial vehicles.

BACKGROUND

Icing is a weather hazard that affects many industries, in particular the aviation industry. For all aircraft, the formation of icing on wing surfaces disrupts air flows and is a serious problem. Icing can result in a loss of lift, an increase in drag and cause an aircraft to stall at a higher airspeed than otherwise. Icing also adds weight to the aircraft. Icing typically reduces the manoeuvrability and increases the power consumption for an aircraft.

Unmanned aerial vehicles, UAVs, are aircraft without human pilots on board. The use of UAVs in commercial, scientific, recreational and many other civilian applications is increasing. For example, civilian applications for UAVs include environmental monitoring (such as pollution and weather), forest fire monitoring, traffic monitoring, precision agriculture, disaster relief, ad hoc communications networks, rural search and rescue, ice flow monitoring and ice flow tracking. Advantages of UAVs over human piloted aircraft are the much lower manufacturing and operating costs of UAVs as well as UAVs being inherently safer as there is never any risk to a human pilot.

Icing is a particularly serious problem for UAVs due to their small size and power restraints. UAVs also tend to fly at relatively low air speeds and low altitudes and, in particular during cold and cloudy weather conditions, this increases the likelihood of ice formation.

Icing detection in human piloted aircraft is often performed visually by the pilot but automatically detecting icing with optical icing detectors is also known. Although it may be possible to provide UAVs with optical icing detectors, this would increase the cost and weight of the UAV.

There are numerous icing prevention techniques that are implemented on large jet powered aircraft. For example, it is known for a flow of hot air from the compressor of the jet engine to be provided over the aircraft's external surfaces. However, such a technique clearly cannot be applied on typical small UAVs that are powered by a motor.

There is therefore a general need to provide techniques for solving the problem of icing formation on UAVs.

SUMMARY

According to a first aspect of the invention, there is provided a method for determining if icing has occurred on a surface of an aircraft, the method comprising: heating a surface of an aircraft; after the heating has stopped, measuring the temperature of the surface as it cools; and determining if icing has occurred on the surface in dependence on the measured temperature; wherein the determination if icing has occurred on the surface comprises: calculating a residual in dependence on measured temperatures and reference temperatures; and determining that icing has occurred if the residual is substantially non-zero.

Preferably, the residual is defined using a model which takes into account the convective heat transfer coefficient.

Preferably, the heating is performed by a heating element in the surface.

Preferably, the heating element is an electro-thermal source.

Preferably, the electro-thermal source is arranged in a layer.

Preferably, the electro-thermal source comprises electrically conductive carbon materials that are preferably carbon nanotubes and/or a mixture of carbon black and graphene.

Preferably, the heating element is integrated within a composite structure that is preferably a laminate structure.

Preferably, the surface is the surface of an aerofoil, a propeller, a rotary wing or any other part of an aircraft.

Preferably, the surface is the surface of a wing; and the heating element is only provided in the leading edge of the wing.

Preferably, heating the surface is performed by applying power to the heating element for a predetermined length of time.

Preferably, the predetermined length of time is in the range 1 to 15 seconds.

Preferably, the applied power is in the range 1000 W to 10000 W for each 1 m2 of the surface that is covered by the heating element.

Preferably, the temperature of the surface is measured by a plurality of sensors in and/or on the surface.

Preferably, the measured temperature is an average of the temperatures of the plurality of temperature sensors.

Preferably the method further comprises using measured temperatures as the surface cools to obtain a temperature profile of the surface as it cools; wherein the determination that icing has occurred on the surface is dependent on the obtained temperature profile.

Preferably, the determination if icing has occurred on the surface is dependent on a comparison of the temperature profile obtained from measured temperatures and a reference profile.

Preferably, said temperature profile is generated in dependence on measured temperatures during a flight of the aircraft but not at the start of the flight of the aircraft, the method further comprising: obtaining the reference profile by, at the start of a flight of the aircraft, heating the surface of the aircraft; and after the heating has stopped, measuring temperatures as the surface cools to obtain the reference profile as the temperature profile of the surface as it cools.

Preferably, the method further comprises determining how thick the layer of ice is when icing has occurred.

Preferably, the temperature of the surface is also measured when the surface is being heated.

Preferably, the determination if icing has occurred on the surface is dependent on measured temperatures of the surface both when the surface is heated and when the surface cools.

Preferably, the method further comprises using the heating element to heat the surface in response to a determination to start icing prevention or icing mitigation.

Preferably, the method further comprises: automatically performing said method for determining if icing has occurred on a surface of an aircraft; and automatically starting icing prevention or icing mitigation in response to a determination that icing has occurred and/or a determination that icing is likely to occur.

Preferably, the method further comprises: automatically performing said method for determining if icing has occurred on a surface of an aircraft in response to a determination that the environmental conditions are suitable for icing to occur.

Preferably, the heating element is a plurality of separate heating elements; and each of the plurality of heating elements is arranged to heat a different part of the surface.

Preferably, the determination that icing has occurred on the surface comprises determining which parts of the surface icing has occurred on; and the method comprises only heating the surface with the heating elements that are arranged to heat the parts of the surface that icing has occurred on.

Preferably, the method further comprises, in response to a determination that icing has occurred on a plurality of parts of the surface, sequentially heating each of said plurality of parts of the surface such that all of said plurality of parts of the surface are not heated at the same time.

According to a second aspect of the invention, there is provided a method of determining which surfaces of an aircraft icing has occurred on, the method comprising, for each of a plurality of surfaces of the aircraft, determining if icing has occurred on the surface in accordance with the method the first aspect.

Preferably, the aircraft is an unmanned aerial vehicle, UAV.

According to a third aspect of the invention, there is provided a surface of an aircraft and an icing control system for detecting icing on the surface of the aircraft, wherein the icing control system comprises a computing system configured to detect icing on the surface of the aircraft in accordance with the method of the first or second aspects.

Preferably, the surface of the aircraft comprises a heating element in its surface.

Preferably, the heating element is an electro-thermal source.

Preferably, the electro-thermal source is arranged in a layer.

Preferably, the electro-thermal source comprises electrically conductive carbon materials that are preferably carbon nanotubes and/or a mixture of carbon black and graphene.

Preferably, the surface of an aircraft has a composite structure, that is preferably a laminate structure, and the heating element is integrated within the composite structure.

Preferably, the surface of an aircraft is an aerofoil, that is preferably a wing of an aircraft; and the heating element is only provided in the leading edge of the aerofoil.

According to a fourth aspect of the invention, there is provided an aircraft comprising the surface of an aircraft and icing control system according to the third aspect.

Preferably, the aircraft is an unmanned aerial vehicle, UAV.

According to a fifth aspect of the invention, there is provided a method of generating calibrated air data estimates of an aircraft, the method comprising: receiving sensor measurement data of the external environment of an aircraft; using the received sensor measurement data as inputs to a first algorithm, wherein the first algorithm is a machine learning algorithm or a parameter estimation algorithm executed by a processor; generating, by the first algorithm, air data estimates in dependence on the sensor measurement data; using the generated air data estimates as inputs to a second algorithm, wherein the second algorithm is an observer algorithm executed by a processor; generating, by the second algorithm, calibrated air data estimates by applying a calibration to the air data estimates generated by the first algorithm.

Preferably, the sensor measurement data is pressure and/or temperature data.

Preferably, the second algorithm is a non-linear observer algorithm.

Preferably, applying a calibration to the air data estimates generated by the first algorithm comprises filtering the air data estimates, optionally by: performing frequency-based addition of signals; or treating the first algorithm as a virtual air data parameter sensor.

Preferably, the first algorithm is a neural network.

Preferably, the neural network is trained on data from one or more of: wind tunnel trials, optionally using a pan-tilt unit to vary angle of attack and/or side-slip angle; training flights; and software simulations, optionally using computational fluid dynamics software or panel method software.

Preferably, the first algorithm is a linear regression algorithm.

Preferably, the second algorithm generates calibrated air data estimates in dependence on the air data estimates generated by the first algorithm and data received from one or more of: an inertial measurement unit of the aircraft, a satellite navigation unit of the aircraft and a pilot tube of the aircraft.

Preferably, the second algorithm generates calibrated air data estimates in dependence on an inertial measurement unit of the aircraft and the data from the inertial measurement unit of the aircraft comprises data on the aircraft's specific force, angular rate and magnetic field.

Preferably, the air data estimates comprise the aircraft's angle-of-attack, side-slip angle and airspeed.

Preferably, the sensor measurement data is received from a plurality of MEMS sensors embedded in the surface of the aircraft and each MEMS sensor is optionally connected to a microcontroller, optionally via a small computer system interface parallel interface (SPI).

Preferably, the aircraft is an unmanned aerial vehicle, UAV.

Preferably, the method further comprises taking outputs of the first and second algorithms, and optionally one or more other air data parameter estimator algorithms, as inputs to a Kalman filter which treats the inputs as Wiener processes, white noise, or Markov models.

According to a sixth aspect of the invention, there is provided a model based method for determining if icing has occurred on a surface of an aircraft, the method comprising: receiving air data estimates of an aircraft, wherein the air data estimates comprise the aircraft's angle-of-attack, side-slip angle and airspeed; receiving external sensor measurement data for the aircraft, wherein the external measurement data comprises data on the aircraft's specific force, angular rate, magnetic field and engine speed; using the received air data estimates and external sensor measurement data to generate a model of the aircraft; determining that icing has occurred on a surface of the aircraft in dependence on a comparison of the generated model with reference data.

Preferably, the method further comprises generating the air data estimates in accordance with the method of the fifth aspect.

According to a seventh aspect of the invention, there is provided an icing control system comprising a computing system configured to perform the method of the fifth or sixth aspects.

According to an eighth aspect of the invention, there is provided an aircraft comprising the icing control system according to claim 50.

Preferably, the aircraft is an unmanned aerial vehicle, UAV.

According to a ninth aspect of the invention, there is provided a method for detecting icing on a surface of an aircraft, the method comprising: receiving a determination that icing has occurred by a first icing detection system; receiving a determination that icing has occurred by a second icing detection system, wherein the second icing detection system uses a different technique to detect icing than the first icing detection system; determining if icing has occurred in dependence on the determinations received from both the first and the second icing detection systems.

Preferably, the first icing detection system detects icing in dependence on a measured temperature profile of a surface of the aircraft as the surface cools.

Preferably, the first icing detection system detects icing according to the method of the first aspect.

Preferably, the second icing detection system detects icing in dependence on a mathematical model of the aircraft.

Preferably, the second icing detection system detects icing according to the method of the sixth aspect.

Preferably, the method comprises: starting the operation of the second icing detection system in response to a determination that potential icing conditions are present; starting the operation of the first icing detection system in response to the second icing detection system detecting icing; and determining that icing has occurred in response to the first icing detection system determining that icing has occurred.

According to a tenth aspect of the invention, there is provided an icing control system comprising a computing system configured to perform the method of the ninth aspect.

According to an eleventh aspect of the invention, there is provided an aircraft comprising the icing control system according to claim 59.

Preferably, the aircraft is an unmanned aerial vehicle, UAV.

According to a twelfth aspect of the invention, there is provided an aircraft comprising a heating element on a surface, wherein the heating element is an electro-thermal source arranged in a layer.

Preferably, the electro-thermal source comprises electrically conductive carbon materials that are preferably carbon nanotubes and/or a mixture of carbon black and graphene.

LIST OF FIGURES

DESCRIPTION OF EMBODIMENTS

Embodiments of the invention provide improved techniques for the detection of icing and the prevention, or mitigation, of icing when it has formed. Embodiments are particularly advantageous when implemented on small UAVs in civilian applications for which autonomous and energy efficient operation is particularly important.

Embodiments of the invention include an icing control system that comprises icing detectors and heating elements, provided by electro-thermal sources. The icing control system operates to accurately detect icing formation. It then controls the electro-thermal sources to prevent, or mitigate, the icing when icing is detected. Both detecting the formation of icing and the operations to prevent, or mitigate, the icing are performed autonomously without human control. In addition, detecting the formation of icing and the operation of the electro-thermal sources is performed in an energy efficient way so as to prevent undue power consumption. The icing control system is integrated within the aircraft design so that it causes little, or no, loss of performance of the aircraft. The icing control system is also low cost and low weight.

Embodiments of the invention also include a new technique for detecting icing using electro-thermal sources. Heating and then measuring the temperature of the electro-thermal sources as they are cooled down by their external environment allows the formation of icing on the electro-thermal source to be accurately detected. Advantageously, this provides an accurate way of detecting icing. In addition, the same electro-thermal sources are used for both icing detection and icing prevention, or icing mitigation. This is therefore an efficient use of the components of a UAV.

Embodiments of the invention also include a new technique for obtaining air data estimates using a machine learning technique in combination with a self-calibration technique. The air data estimates are used to build a mathematical model of the aircraft that is built using measured and estimated data. Icing is detected if the modelled behaviour of the aircraft differs from the expected behaviour of the aircraft when icing is not present. Advantageously, this way of detecting icing has low power consumption.

The icing control system according to embodiments is described in more detail below.

The icing control system provides an intelligent icing protection solution, IPS, that uses intelligent algorithms for both detecting icing and controlling processes for preventing, or mitigating, icing formation on the exposed surfaces of a UAV. The icing control system comprises a plurality of components. The implementation of the system is advantageously small, reliable, lightweight, and comprised of inexpensive materials and components.

Figure 1:
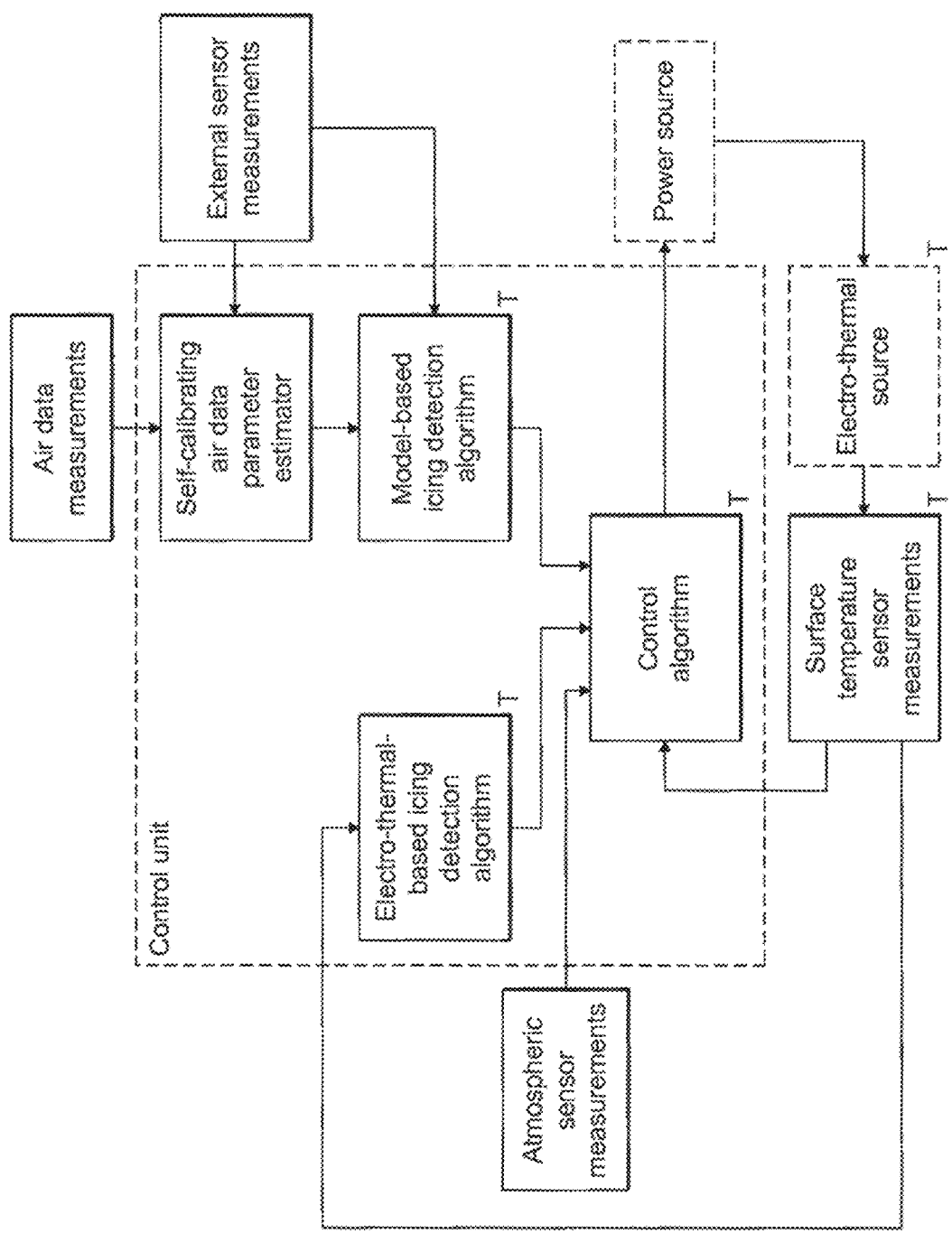
FIG. 1 is a block diagram of components of an icing control system according to an embodiment.

FIG. 1 shows components of the icing control system.

It should be noted that embodiments of the icing control system include implementations with more blocks in the control unit than shown in FIG. 1 and more blocks external of the control unit. A preferred implementation comprises the aircraft having only one set of sensors that provide atmospheric sensor measurements; only one set of sensors that provide external sensor measurements; only one set of sensors that provide air data estimates, which include pressure sensor measurements; only one power source; and only one self-calibrating air data parameter estimator component within the control unit. All of the other components, internal and external to the control unit, preferably have one or more duplicates. For example, each wing has its own electro-thermal source and corresponding set of sensors for providing the surface temperature sensor measurements. Separate icing detection algorithms are implemented respectively for each arrangement of electro-thermal source and temperature sensors.

The icing control system comprises the primary elements of:
1) a control unit,
2) an electro-thermal source, and
3) a power source.

The control unit receives inputs from on-board sensors of atmospheric and other ambient conditions. If icing is detected, an intelligent control algorithm controls the power supplied to the electro-thermal sources in a way that is both appropriate for mitigating the ice formation and also minimizing power consumption.

As shown in FIG. 1 there are a number of sensor measurement components that provide measurements to the control unit.

The External Sensor Measurements component includes an inertial measurement unit, IMU. An IMU is an electronic device that measures and reports a body's specific force, angular rate and the magnetic field surrounding the body. These measurements are obtained using a combination of accelerometers, gyroscopes, and magnetometers. The IMU supplies measurements of the specific force and angular rate of the aircraft. The External Sensor Measurements also include a pilot-static tube providing measurements of the relative velocity in the longitudinal axis of the aircraft; an engine speed sensor and control surface input measurements. The External Sensor Measurements also include a satellite receiver for obtaining location data from GNSS-based ground velocity measurements.

The Air Data Measurements is data from a number of sensors, that are appropriately located about the aircraft, and provide pressure measurements and preferably also temperature measurements.

The Atmospheric Sensor Measurements provides both ambient temperature and relative humidity measurements.

The Surface Temperature Sensor Measurements is comprised of a sensor array preferably embedded at least in each wing. These sensor arrays supply the control unit with temperature measurements of the electro-thermal sources.

Each electro-thermal source is a heating element. Each electro-thermal source may be made from carbon materials. Preferably, each electro-thermal source is in the form of an electrically conductive carbon nanomaterial coating that is applied in a layer through a liquid carrier. The coating preferably comprises a mixture of graphene, carbon black and a bonding system in the form of polyurethane.

Carbon black is virtually pure elemental carbon (approximately 97% pure) in the form of colloidal particles that are produced by incomplete combustion or thermal decomposition of gaseous or liquid hydrocarbons under controlled conditions. Its physical appearance is that of a black, finely divided pellet or powder.

Graphene is an allotrope of carbon in the form of a two-dimensional, atomic-scale, honeycomb lattice in which one atom forms each vertex. It is the basic structural element of other allotropes, including graphite, charcoal, carbon nanotubes and fullerenes. Graphene has many extraordinary properties. It is about 100 times stronger than the strongest steel. It conducts heat and electricity efficiently and is nearly transparent.

The electro-thermal sources may also be constructed form carbon nanotubes. Carbon nanotubes (CNTs) are seamless cylindrical hollow fibres, comprised of a single sheet of pure graphite (a hexagonal lattice of carbon, similar to a chain link fence), having a diameter of 0.7 to 50 nanometres with lengths generally in the range of tens of microns. Being a hollow tube comprised entirely of carbon, they are also extremely lightweight. The type of bond holding the carbon atoms together is very strong, plus the hexagonal pattern of the atoms themselves gives rise to a phenomenon known as electron derealization. This means that under the right conditions electrical charge can move freely in a nanotube. The regular arrangement of the atoms also can vibrate in ways that effectively move heat through the tube, so thermal conductivity is high as well as electrical conductivity. At the individual tube level, these unique structures exhibit 200 times the strength and 5 times the elasticity of steel; 5 times the electrical conductivity, 15 times the thermal conductivity and 1,000 times the current capacity of copper. The structures also have almost half the density of aluminium.

A preferred construction material for a UAV is carbon fibre. Carbon fibre is made of carbon crystals aligned in a long axis. These honeycomb shaped crystals organize themselves in long flattened ribbons. This crystal alignment makes the ribbon strong in the long axis. In turn these ribbons align themselves within fibres. The fibre shape is the original shape of the material (its precursor) used to produce the carbon fibre.

Providing the electro-thermal source as a layered carbon material allows for good integration with a laminate carbon fibre structure. However, embodiments also include the use of other known types of electro-thermal source, such as aluminium or copper based electro-thermal sources.

For a layered electro-thermal source, the internal resistivity, and therefore heating provided by the electro-thermal source is dependent on the thickness of the applied layer and the surface area of said layer.

Possible constructions of the electro-thermal source for use in embodiments are provided in: 'Carbon nanomaterial-based wing temperature control system for in-flight anti-icing and de-icing of unmanned aerial vehicles', by Sorensen et al., 2015 IEEE Aerospace Conference, 7-14 Mar. 2015, Print ISBN:978-1-4799-5379-0; ieeexplore.ieee.org/xpl/login.isp?tp=&arnumber=7119206&url=http%3A%2F%2Fieeexplore.iee e.org%2Fxpls%2Fabs_all.jsp%3Farnumber%3D7119206 (as viewed on Oct. 8, 2016), the entire contents of which are incorporated herein by reference.

Another possible construction of the electro-thermal source is provided in 'Carbon Nanotube (CNT) Enhancements for Aerosurface State Awareness', Kessler and Dunn of Metis Design Corporation; Wicks, Guzman de Villoria and Wardle of MIT, IWSHM-2011; dspace.mit.edu/openaccess-disseminate/1721.1/81249, viewed on 11 Jul. 2016.

Figure 2:
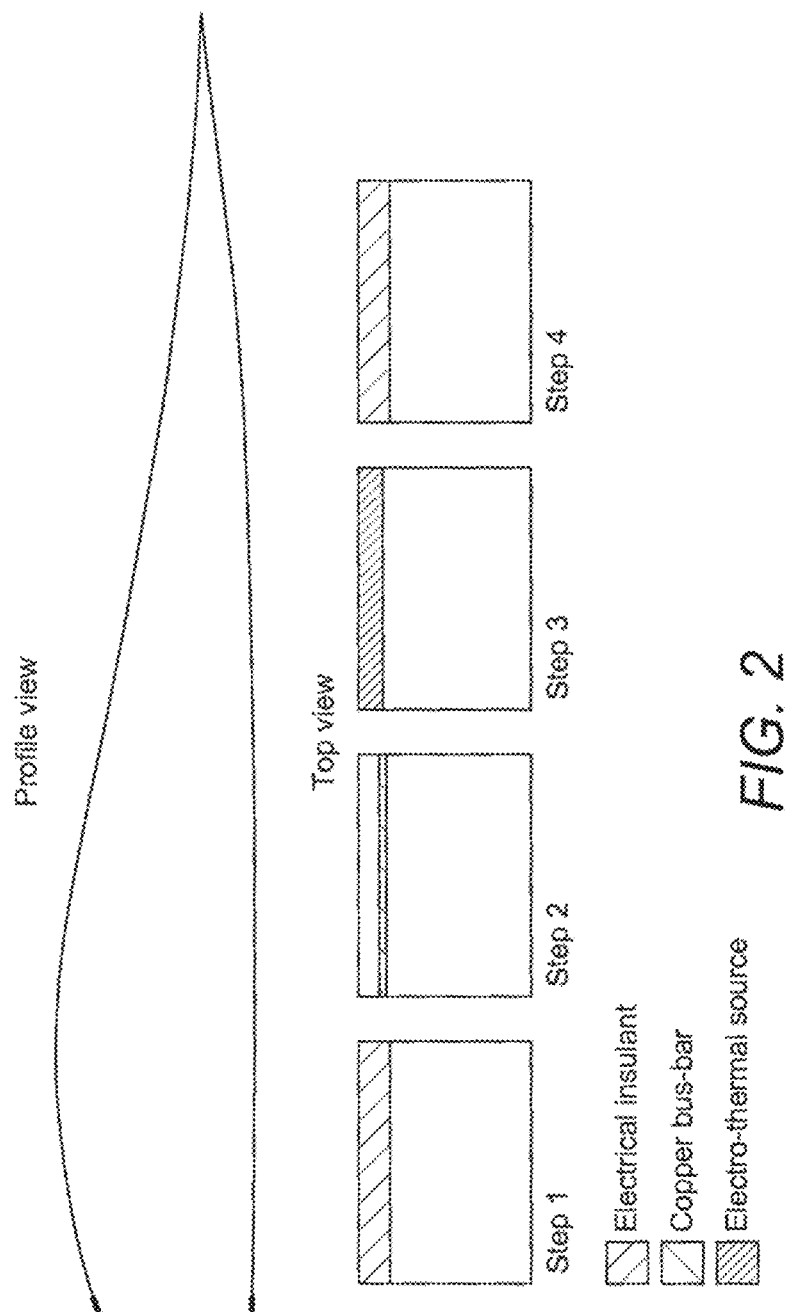
FIG. 2 shows an arrangement of an electro-thermal source on a wing according to an embodiment.

FIG. 2 shows a preferable arrangement of an electro-thermal source on a wing and how power is supplied to the electro-thermal source.

As can be seen from the profile view, in this embodiment the electro-thermal source is only provided on the leading edge of a wing, which is the part of the wing that is most likely to experience icing.

The top view shows the four steps in the process of applying an electro-thermal source as a layer on a wing. Step 1 is to apply a layer of an electrical insulator on the surface of the wing. In step 2, a conductive bus bar, that is preferably copper, is then positioned on the layer of insulator. In step 3, the electro-thermal source is then applied in a layer above the bus bar. In step 4, another layer of electrical insulator is applied above the electro-thermal source. Power is supplied to the electro-thermal source through the bus bar. The power consumption of the electro-thermal source, and therefore heating of the surface of the wing, is dependent on the thickness, location, and layout of the electro-thermal source.

Preferably an electro-thermal source is located at least in each wing of the aircraft. However, electro-thermal sources may also be provided on any other surfaces of the aircraft on which it is particularly important that icing is prevented of mitigated and/or if it is known that the surface is likely to experience icing. The power source for each electro-thermal source may be a battery pack, such as lithium polymer batteries. Alternatively, or in addition, electrical power can be supplied that is derived from the aircraft engine.

The control unit receives inputs from external components that comprise measurement sensors. These inputs are processed by the internal components of the control unit to provide inputs to the control algorithm so that the control algorithm can determine how and when the power source is controlled to heat each electro-thermal source.

The internal components of the control unit are described below.

The Self-Calibrating Air Data Parameter Estimator component obtains measurements from an array of sensors that are appropriately positioned about the aircraft. The sensors are comprised by the Air Data Measurements component and provide data for estimating the angle-of-attack (AOA), side-slip angle (SSA) and airspeed of the aircraft (commonly referred to collectively as the air data parameters). These parameters are directly related to the performance of the aircraft. For a given wing profile, the AOA will for example determine when the wing is under stall conditions which leads to a significant drop in lift force and large increase in separation of flow behind the wing. As an example of the air data parameter relation to flight safety condition, flying in icing conditions can result in an accretion of ice on the wings, which will alter the aerodynamic capabilities. This degradation in performance can be detected if the AOA is known.

Figure 3:
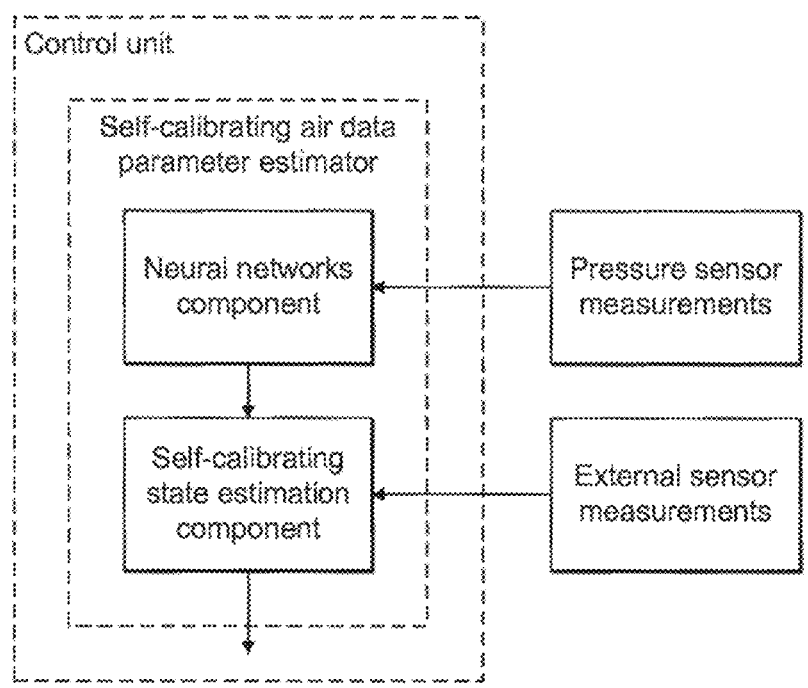
FIG. 3 shows the components of and inputs to a self-calibrating air data parameter estimator according to an embodiment.

Each sensor preferably provides a pressure measurement and a temperature measurement. At least the pressure measurement, and preferably both the pressure and temperature measurements, are used as inputs to a machine-learning algorithm, that is preferably a neural networks algorithm, that provides the air data estimates, i.e. angle-of-attack, side-slip angle and airspeed. These neural network obtained air data estimates are processed by a nonlinear observer algorithm that uses a model of the aircraft and optionally live data such as IMU measurements and/or location data (e.g. from a satellite navigation component), provided by the External Sensor Measurements component. This enables the nonlinear observer algorithm to estimate a correction term of the aircraft model and the neural network air data estimates, hence providing a method for online calibration of the complete air data estimation. An illustration of the internal components of the Self-Calibrating Air Data Parameter Estimator component is provided in FIG. 3.

The model-based icing detection algorithm receives inputs from the external sensor measurements component, in the form of, for example, angular velocities, specific force, and engine speed measurements, as well as estimates provided by the Self-Calibrating Air Data Parameter Estimator component. These inputs are used, by the model-based icing detection algorithm, to generate a mathematical model for detecting icing.

The model-based icing detection algorithm detects ice when it forms on the aircraft during flight operations. It uses a mathematical model, that is an aerodynamic model, of the aircraft to detect structural, or aerodynamic, faults, which are an indication that icing has formed. The algorithm uses estimates of aerodynamic parameters, that are obtained under standard flight conditions as reference data, and the mathematical model of the aircraft. Should the differences between the aerodynamic parameters and the mathematical model become substantial, and/or unexpected changes occur, a structural fault is detected. If the structural fault is indicative of icing forming on, for example, the leading edge of the wings of the aircraft, the algorithm generates a signal that alerts the central fault diagnosis algorithm component of the risk. The model-based icing detection algorithm may use the specific control signals of thrust and deflection angles. These can be either commanded or measured.

The model-based icing detection algorithm preferably detects icing by implementing the icing detection techniques as disclosed in K. L. Sørensen, M. Blanke, T. A. Johansen; 'Diagnosis of Wing Icing Through Lift and Drag Coefficient Change Detection for Small Unmanned Aircraft'; IFAC Safeprocess'15—Paris, France; Volume 48; issue number 21; Pages 541-546; ISSN: 1474-6670, the entire contents of which are incorporated heroin by reference.

The operation of the Self-Calibrating Air Data Parameter Estimator component for the model-based icing detection algorithm is described in more detail later in the present document.

The electro-thermal-based detection algorithm provides another technique for icing detection. The icing detection performed by the electro-thermal-based detection algorithm and model-based icing detection algorithm are separate processes that make independent determinations on whether or not icing has occurred.

The electro-thermal-based detection algorithm does not use an aerodynamic model of the aircraft. It instead uses a thermodynamic model of the system surrounding the aircraft wings and the electro-thermal sources. The thermodynamic model of the system includes the composite structure of each wing and the electro-thermal source in each wing, the airflow around the wing, water layers, and an ice layer. The inputs to the electro-thermal-based detection algorithm are supplied by the surface temperature sensors embedded in each wing and/or each electro-thermal source.

As described earlier with reference to FIG. 2, each electro-thermal source is preferably located on the leading edge of an aircraft wing. The rate at which the temperature of the surface of a wing changes is dependent on whether or not ice has formed. The electro-thermal-based icing detection algorithm obtains measurements of wing surface temperatures after an electro thermal source has heated the wing surface. These are then used to determine temperature gradients as the wing is cooled by the environment. If the temperature gradients substantially differ, and/or change unexpectedly, from reference gradients, the formation of icing is detected and the algorithm produces a signal that alerts the central fault diagnosis algorithm.

The operation of the electro-thermal-based detection algorithm is described in more detail later in the present document.

The Control Algorithm component preferably comprises a central fault diagnosis algorithm component that receives and assesses alert signals from the model-based icing detection algorithm component and electro-thermal-based detection algorithm component of the control unit. Embodiments also include the central fault diagnosis algorithm component being provided as a separate component to the Control Algorithm. The central fault diagnosis algorithm component uses external measurements and reference data to automatically assess the present situation and determine whether or not icing has occurred and/or is likely to occur. If the external measurements indicate a reduction in thrust, more thrust is required to achieve the desired altitude, or more thrust is required to maintain the desired airspeed, while the icing detection algorithms have raised alarms, then it is appropriate to determine that icing has occurred and is a cause for the need for more thrust.

If the central fault diagnosis algorithm component determines that icing has occurred, and/or that icing is likely to occur, then it outputs a signal that informs the control algorithm component of this. The control algorithm component can then change its mode of operation so that any icing formation is appropriately mitigated or prevented.

The control algorithm has the purpose of controlling the supply of power by the power source to the electro-thermal sources. The power supply is controlled to be sufficient, and in the required manner, for the electro-thermal based detection of icing to be performed. If icing is detected, then the power supply is controlled to be sufficient and in the required manner, for icing prevention, or icing mitigation, to be performed. By ensuring that only the required power is used for specific and necessary tasks, the power consumption as a result of providing an icing solution is minimised.

When the heating of a surface is required, the control algorithm sends a signal to the power source component that specifies how much current should flow through the electro-thermal source in the surface and for what time period. The operation of the control algorithm is dependent on the power source as well as the internal composition and structural layout of the electro-thermal source. The control of the power source by the control algorithm may be dependent on the amount of power remaining in the power source and/or the power that the power source is able to provide at that particular time.

The control algorithm receives signals from the central fault diagnosis algorithm component that informs it if icing has been detected. The control algorithm also receives inputs from the Atmospheric Sensor Measurements component, that indicate possible icing conditions through ambient temperature and relative humidity measurements, and from the surface temperature sensors. The control algorithm can automatically change its mode of operation in dependence on the received data.

The data received by the control algorithm from the Atmospheric Sensor Measurements component allows the control algorithm to determine if the present weather conditions are conditions in which icing can, or is likely to occur. If the data received by the control algorithm from the Atmospheric Sensor Measurements component indicates that icing is not likely to occur, then the control algorithm preferably operates in a mode in which no icing detection or prevention/mitigation is performed. Advantageously this prevents unnecessary power consumption caused by operating the icing detection and icing prevention/mitigation systems when icing is unlikely to occur. As soon as the data received by the control algorithm from the Atmospheric Sensor Measurements component indicates that icing can occur, or is likely to occur, then the control algorithm preferably starts to operate one or both of the icing detection algorithms according to embodiments.

The control algorithm can operate in different modes as required for:
1) icing detection;
2) anti-icing; and
3) de-icing.

The icing detection mode provides a combined operation of the electro-thermal-based icing detection algorithm and the control algorithm. The control algorithm provides healing of the electro-thermal sources by controlling the power source component to provide rapid power bursts to the electro-thermal sources that result in a corresponding heating of the electro-thermal sources. The electro-thermal-based icing detection algorithm uses this heating pattern to obtain estimates of surface temperature gradients and thereby detect if icing has occurred. This may be the default mode of operation of the control algorithm under all flight conditions until the mode of the control algorithm changes due to icing being detected.

The anti-icing mode prevents icing from forming on surfaces by ensuring that the electro-thermal sources heat the surfaces to maintain the surface temperature at a specified level above freezing. This can be achieved through a feedback control in which the control algorithm uses the input received from the surface temperature sensor measurements and a pre-defined temperature set-point, i.e. desired electro-thermal source temperature. This mode is only active when it has been primed, i.e. activated. The activation may be performed in response to feedback from the atmospheric sensor measurements.

The purpose of the de-icing mode is to reduce power consumption by mitigating, rather than preventing, ice formation.

Ice is allowed to form on surfaces. Once icing has been detected, the de-icing procedure is activated and the control algorithm generates a signal to the power source. In response, the power source provides the electro-thermal sources with a succession of shorter power bursts, each burst followed by a longer period where no power is supplied by the power source. This process should result in short period of ice formation on a surface, followed by a rapid temperature increase of the surface and therefore aerodynamic ice shedding.

The anti-icing procedure typically has a lower peak-power requirement than that of the de-icing procedure. However, due to the nature of the two different procedures, anti-icing requires a larger average power than de-icing and is therefore a greater drain on the power source.

The anti-icing procedure requires maximum power from the power source only to achieve a desired set point temperature. Once that temperature has been achieved, the power consumption required to maintain the desired temperature is lower than maximum, depending primarily on atmospheric conditions and the electro-thermal source layout. The de-icing procedure requires maximum power to achieve a desired set point temperature, like the anti-icing approach. The set point temperature for the de-icing however is higher and more time with the maximum power is required. The maximum power is only required until the set point temperature has been reached, or until icing has been shed. The difference from the anti-icing approach is that the set point temperature for the de-icing approach is not maintained throughout operations in icing conditions. The de-icing is only active when icing is present and then power is only required for shorter bursts, typically less than 60 seconds, followed by a cooling period, where potential icing is allowed to form on the exposed surface.

Advantageously, the icing control system comprises components for automatically detecting icing and automatically preventing, or mitigating, the presence of icing in an energy efficient way.

The icing can be detected by the model-based icing detection algorithm and/or the electro-thermal-based detection algorithm. An advantage of the model-based icing detection algorithm is that it does not require heating of the electro-thermal sources and it therefore requires less power than the electro-thermal-based detection algorithm. An advantage of the electro-thermal-based detection algorithm is that it can generally be expected to be more accurate than the model-based icing detection algorithm because the detection is based on temperature measurements from the actual surface on which it is desired to detect icing rather than a model of any of the conditions at the surface.

Embodiments include the model-based icing detection algorithm and the electro-thermal-based detection algorithm both operating simultaneously and in parallel with each other from as soon as it is determined to start icing detection (which may be either from the start of the flight or in response to potential icing conditions being detected). The icing control system then determines whether or not icing has occurred in dependence on the outputs of both of the detection algorithms. However, embodiments also include the icing control system alternatively operating with only the model-based icing detection algorithm or only the electro-thermal-based detection algorithm and only one of the model-based icing detection algorithm and electro-thermal-based detection algorithm ever being used for icing detection.

A preferred way of operating the icing control system according to an embodiment is for the model-based icing detection algorithm to be operated continuously either from as soon as a flight has started, or, preferably, from as soon as atmospheric conditions with icing potential are detected. The electro-thermal-based detection algorithm, which requires more energy to operate, is initially operated infrequently, or, preferably, not operated at all. In response to the model-based icing detection algorithm detecting icing, the electro-thermal-based detection algorithm is then operated either on its own or together with the model-bases icing detection algorithm in order to corroborate the determination by the model-based icing detection algorithm. Embodiments also include the electro-thermal-based detection algorithm being operated more frequently, such as continuously from as soon as the flight has started or from as soon as atmospheric conditions with icing potential are detected. The de-icing or anti-icing modes are only started once the electro-thermal-based detection algorithm detects icing.

Advantageously the icing detection is performed in an energy efficient way since the more accurate, but more power consuming, electro-thermal-based detection algorithm is only used frequently after icing has already been detected as occurring, or likely to occur, by the model-based icing detection algorithm.

Advantageously the icing control system is highly suited to implementation on small UAVs.

Embodiments therefore provide an icing control system that is an intelligent icing protection solution, IPS, that uses intelligent algorithms for both detecting icing and controlling processes for preventing, or mitigating, icing formation on the exposed surfaces of a UAV. The icing protection solution is based on the primary elements of: 1) electro-thermal sources 2) an intelligent control unit, and 3) a power source. The control unit is primed by an on-board atmospheric sensor package, measuring ambient environmental conditions. Once the risk of icing is established, two ice detection algorithms—working in parallel—are activated. This approach ensures robustness and accuracy. If icing is detected, the control algorithm controls the supply of power to the electro-thermal sources, thereby achieving temperature control of each thermal source, while minimising power consumption.

Whether or not anti-icing or de-icing is performed may be predetermined prior to each flight based on the weather conditions, or automatically determined during a flight based on the weather conditions. For example, if there are many clouds at the altitude of operation, then only performing anti-icing would be appropriate, as the risk of icing would be more or less permanent. However, if the attitude of operation was above a cloud cover, only performing de-icing would be appropriate as icing would only be an issue climbing or descending through the cloud cover.

Embodiments of the invention that provide the new technique for detecting icing using electro-thermal sources are described in more detail below.

The determination made by the electro-thermal-based icing detection algorithm is based on the thermodynamic system surrounding each electro-thermal source, the corresponding aircraft surface and ambient conditions. The algorithm uses residuals and statistical change detection to determine if ice formation has occurred.

When an aircraft is operating in non-icing conditions, there is a thermodynamic system that comprises the aircraft wings, the electro-thermal sources, a water layer (depending on atmospheric conditions), and the airflow surrounding the aircraft. When icing occurs then the thermodynamic system comprises another element and this results in a significant change to the flow of energy in the system. It is this change in energy flow that the electro-thermal-based icing detection algorithm uses to determine that icing has occurred.

A specific embodiment is now considered in which there is an array of K-type thermocouples embedded in an electro-thermal source/wing that provide temperature measurements of the surface of an aircraft wing. The electro-thermal source is activated in a specific on/off pattern in which the either the entire electro-thermal source is heated or none of the electro-thermal source is heated. The heating pattern enables temperature gradient estimation.

The thermodynamic theory is proved below.

It is assumed that the average temperature of the electro-thermal source, $T_{ETS}$ depends on convective cooling and joule heating alone, i.e.

$$\dot{q} = -\dot{q}_c + \dot{q}_{ETS} \quad \text{Eqn. 1}$$

Eqn. 1 is based on thermal energy balance for a given thermodynamic system. In Eqn. 1, the energy out of the system is assumed to be a result of thermal convection alone and the generated energy comes from the electrical heating of the electro-thermal source. The rate of thermal convection, $\dot{q}_C$, can be equated with the temperature drop of the body volume, i.e. the volume of the electro-thermal source, over time, as shown in Eqn. 2.

$$\dot{q}_c = -\bar{h}A(\bar{T}_{ETS} - T_\infty) = \rho c_p V \frac{d\bar{T}_{ETS}}{dt} \quad \text{Eqn. 2}$$

where $\rho$ and $c_p$ are the density and specific heat capacity of the electro-thermal source, respectively. V and A are the volume and area of the electro-thermal source, respectively. $\bar{h}$ is the convective heat transfer coefficient.

The linear time invariant system of Eqn. 2 can be cast in in the form of:

$$\frac{d\bar{T}ETS}{dt} + \frac{1}{\tau}\bar{T}_{ETS} = \frac{1}{\tau}T_\infty \qquad \text{Eqn. 3}$$

where the thermal time constant, $\tau$, is given by:

$$\tau = \frac{\rho c_p V}{\bar{h}A} \qquad \text{Eqn. 4}$$

which is a feature of the lumped capacity analysis method, or lumped system analysis, for a thermodynamic system. Applying this method is based on the assumption that the internal conductive resistance to heat transfer is significantly greater than that of the external convective heat transfer. This assumption is related to the Biot modulus, which can be expressed as:

$$Bi = \frac{\bar{h}V}{kA} \qquad \text{Eqn. 5}$$

Where k is the thermal conductivity of the electro-thermal source. A commonly applied rule is that the error inherent in a lumped system analysis will be less than 5% for a value of Bi less than or equal to 0.1.

Eqn. 3 implies that the difference between the electro-thermal source and the surroundings, as a function of time, is given by:

$$\Delta T(t) = \Delta T_0 e^{-t/\tau} \qquad \text{Eqn. 6}$$

where $\Delta T_0$ is the temperature difference at simulation time t=0. Eqn. 6 is a mathematical expression that implies that the electro-thermal source assumes the temperature of the surroundings at an exponentially decaying rate governed by the thermal time constant $\tau$.

For detection purposes the expression on the right hand side of Eqn. 6, including the theoretical thermal time constant of Eqn. 4 serves as a reference. The left hand side of Eqn. 6 is the measurable quantity. Consequently the resultant residual can be defined as:

$$r = \Delta T_0 e^{-t/\tau} - \Delta T(t) \qquad \text{Eqn. 7}$$

Where $r \approx 0$ when no icing has occurred and $r \neq 0$ when icing has occurred. A robust criterion should evaluate average |r| over a given time window after de-activating the electro-thermal source.

For clarification, the term $\Delta T_0 e^{-t/\tau}$ in Eqn. 7 is the theoretical (or nominal) response and $\Delta T(t)$ is its measured equivalent. Icing is said to be present when the measured temperature response (or signature) deviates from the nominal response.

Thermal convection occurs as energy transfer due to diffusion and by bulk (or macroscopic) motion of a fluid. This motion is attributed to large number of molecules moving collectively or as aggregates. In the presence of a temperature gradient such motion contributes to the transfer of thermal energy. As molecules in aggregate maintain their random motion, the combined thermal transfer is due to the superposition of energy transferral by random motion of the molecules and the bulk motion of the fluid.

An alternative description of the physical process of thermal convection follows. Consider a cold fluid flowing past a warm body. The fluid immediately adjacent to the body forms a layer of thickness $\delta$, which flows at a reduced velocity. This layer is known as the boundary layer. Heat is conducted into the boundary layer, which transports it farther downstream, where it is mixed with the cooler free stream flowing fluid. This process, where heat is transported by a moving fluid is called convection. The mathematical representation of convection attributed to Sir Isaac Newton is given by $$\dot{Q} = \bar{h}\Delta T \qquad \text{Eqn. 8}$$

where $\Delta T \equiv (T_s - T_\infty)$. Eqn. 8 is the steady-state form of Newton's law of cooling, where $T_s$ is the solid's surface temperature and $T_\infty$ is the temperature of the oncoming flow. The coefficient $\bar{h}[W/(m \cdot K)]$ is termed the convective heat transfer coefficient. The convective heat transfer coefficient is a highly intricate quantity to predict and it is tightly linked to the motion of the fluid flowing around the body that is heated or cooled.

The boundary layer can be in either a turbulent or laminar flow regime, where the latter is characterised by the fluid flowing in parallel layers, i.e. there is no transferral of fluid particles between the parallel layers, nor any swirls or eddies. Properties concerning the laminar flow regime is a high momentum of diffusion and a lower momentum of convection. We assume here that the flow around relevant areas of a given aerofoil is laminar.

It is evident that thermal convection is highly interconnected with fluid dynamics, therefore significant parameters necessitate an introduction. One such parameter is a dimensionless quantity that aides the characterisation and quantification of different flow regimes and is known as the Reynolds number, Re, which is defined as the ratio of momentum forces to viscous forces. Laminar flow generally occurs at low Reynolds numbers (though still at Re>$10^4$ for aerofoils, where viscous forces are more dominant, or where the flow velocity is less dominant). For flow around aerofoils Re is defined as $$Re = \frac{V_\infty x_c}{v} \qquad \text{Eqn. 9}$$

where $V_\infty$ is the free stream flow velocity, $x_c$ is a characteristic linear dimension (for aerofoils this corresponds to the chord line), and v is the kinematic viscosity of the fluid in which the aerofoil operates.

The Prandtl number (Pr) is another significant parameter. It can be summarised as the ratio of molecular kinematic viscosity to the molecular thermal diffusivity, and is defined as $$Pr \equiv \frac{v}{\alpha} \qquad \text{Eqn. 10}$$

The values of the Prandtl number indicate the interrelation between the thickness of the boundary layer $\delta$ and the thickness of the thermal boundary layer $\delta_t$. If Pr=1 it indicates $\delta = \delta_t$, further when Pr<1 $\Rightarrow \delta < \delta_t$, and conversely when Pr>1 $\Rightarrow \delta > \delta_t$. Intuitively this is sensible as high viscosity leads to a thick boundary layer, and a high thermal diffusivity should imply a thick thermal boundary layer.

When a temperature difference exists between a solid and the free stream of a fluid flowing past, a thermal boundary layer is present, with thickness $\delta_t$, different from the thickness of the boundary layer $\delta$. Heat transfer at the surface is by conduction and, as such $$-k_f \frac{\partial (T - T_s)}{\partial y}\bigg|_{y=0} = \overline{h}(T_s - T_\infty) \quad \text{Eqn. 11}$$

Where $k_f$ is the conductivity of the fluid, T is the temperature at a given point in the thermal boundary layer, and y is a perpendicular distance from the surface of the solid. The term on the left of the equality corresponds to Fourier's law (of thermal conduction) in one-dimensional space. Rearranging Eqn. 11 and multiplying by the inverse of a characteristic linear dimension results in $$\frac{\overline{h} x_c}{k} = \frac{\frac{\partial (T - T_s)}{\partial y}\bigg|_{y=0}}{\frac{(T_s - T_\infty)}{x_c}} \equiv Nu_{x_c} \quad \text{Eqn. 12}$$

which is known as the Nusselt number (Nu) and can be summarised as the ratio of conductive thermal resistance to the convective thermal resistance of the fluid.

For forced convection the Nusselt number can also be expressed as a function of the Reynolds and Prandtl numbers $$\frac{\overline{h} x_c}{k} = (Nu_{x_c}) = f(Re, Pr) \quad \text{Eqn. 13}$$

A Nusselt number close to 1 signifies laminar flow, where larger values for Nu correspond to a turbulent flow.

Thermal convection is generally divided into two main classifications. These are related to the driving force causing the flow. For the work presented in this document focus is limited to forced convection, as opposed to free or natural convection. Forced convection is the classification applied for describing convection, where fluid circulation is produced by an external agent, such as wind, a fan, or the forced movement of a body through a fluid.

The use of the convective heat transfer coefficient in the proposed model enables a much more dynamic, informed, and robust icing detection method compared to other solutions that typically rely on simple temperature changes or static thermal conduction parameters.

Methods such as this, in which icing is detected based on comparing a response to a known response for non-icing conditions, benefit from requiring less energy consumption than methods which detect icing by detecting when the temperature response flattens for melting due to the input energy supplying the latent heat of fusion.

Provided below are the results of a simulation that was performed for demonstrating the performance of electro-thermal based icing detection.

The simulation environment was based on the following assumptions:
1) All of the physical elements of the model, i.e. thermal source, aerofoil surface, aerofoil core, and surface ice are assumed to be in perfect thermal contact.
2) The flow near the aerofoil is laminar.
3) The air pressure in the simulation environment is constant.
4) The ambient temperature is constant (free stream flow temperature $T_\infty$=constant).
5) The conditions along the span of the aerofoil are uniform. The 2D simulation environment is therefore assumed to acquire all major aspects of the thermal response of the system. This is a reasonable assumption as the impact of differential span-directional contributions will be negligible compared to chord-directional contributions.
6) The Blot modulus of Eqn. 5 is less than or equal to 0.1.
7) The average temperature of the electro-thermal source depends on convective cooling and electrical heating alone.

The model parameters are as follows:
The power supplied to the electro-thermal source is $\dot{q}ETS$=500 W/m2
The average convective heat transfer coefficient over the surface area of the electro-thermal source is $\overline{h}$=500 W/m$^2$·K
The area size of the applied electro-thermal source is A=0:0638 m2.
The electro-thermal source volume is V=1.2750×10$^{-5}$ m$^3$
The density of the electro-thermal source is $\rho$=1300 kg/m$^3$
The specific heat capacity of the electro-thermal source is $c_p$=1100 J/kg·K
The conductivity of the electro-thermal source is k=1.00 W/m·K The above parameters for an electro-thermal source are as stated by a material supplier.

The simulation environment was generated using the commercial COMSOL Multiphysics finite-element software package. COMSOL supports fully transient, multi-dimensional, nonlinear, thermal finite-element modelling, including temperature dependent material properties and complex boundary conditions.

The simulation environment developed mimics that of a wind icing tunnel. The inlet airspeed $V_{in}$ is $V_{in}$=$V_\infty$=20 ms$^{-1}$ and the surrounding temperature (or ambient temperature, $T_a$, is $T_a$=$T_\infty$=−20° C. The simulation is initialised with an activation of the electro-thermal source, by supplying P=500 W/m$^2$ for 10 seconds. This applied power forces the thermodynamic system out of a state of equilibrium and into a transient stage. The total simulation time is 60 seconds and for the remainder of the simulation period the electro-thermal source does not have any electrical power supplied to it such that, after sufficient time, the thermodynamic system returns to equilibrium.

The icing detection is based at least on the temperature profile that starts as soon as the heating of the electro-thermal source is stopped, i.e. when the temperature of the surface is falling due to cooling of a surface by its external environment. The temperature profile in the cooling phase is advantageous over that in the heating phase since it depends on changes in heat convection coefficient rather than specific heat coefficient. That is to say, the temperature profile in the heating phase is dominated by the heat capacity of the surface. The temperature profile during the cooling phase is influenced more by the convective flow of heat from the surface to the environment. In addition, the temperature profile during the cooling phase can be determined over a longer period of time than in the heating phase and is therefore both more affected by convective flow and the longer measurement period allows it to be determined more accurately. Using the temperature profile during the cooling phase also does not require accurate control of the heating of the electro-thermal source and a temperature profile for determining if icing has occurred is still obtained when the electro-thermal source is heated intermittently and with a variable and unknown amount of power.

A simulated dataset has been obtained with an icing layer applied to the leading edge of the aerofoil and another dataset has been obtained under the same condition but without the icing layer. The icing layer is 2 mm at its thickest, which coincides with the leading edge of the aerofoil.

Figure 4A:
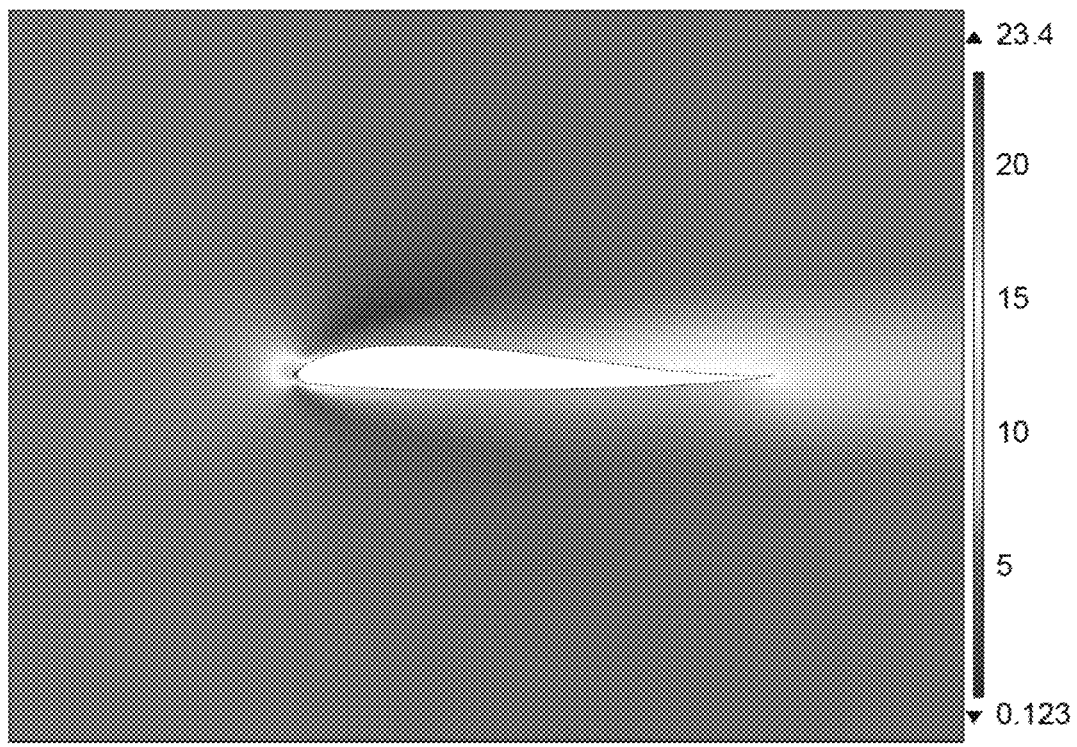
FIGS. 4A and 4B show the airflow distribution around an aerofoil.
Figure 4B:
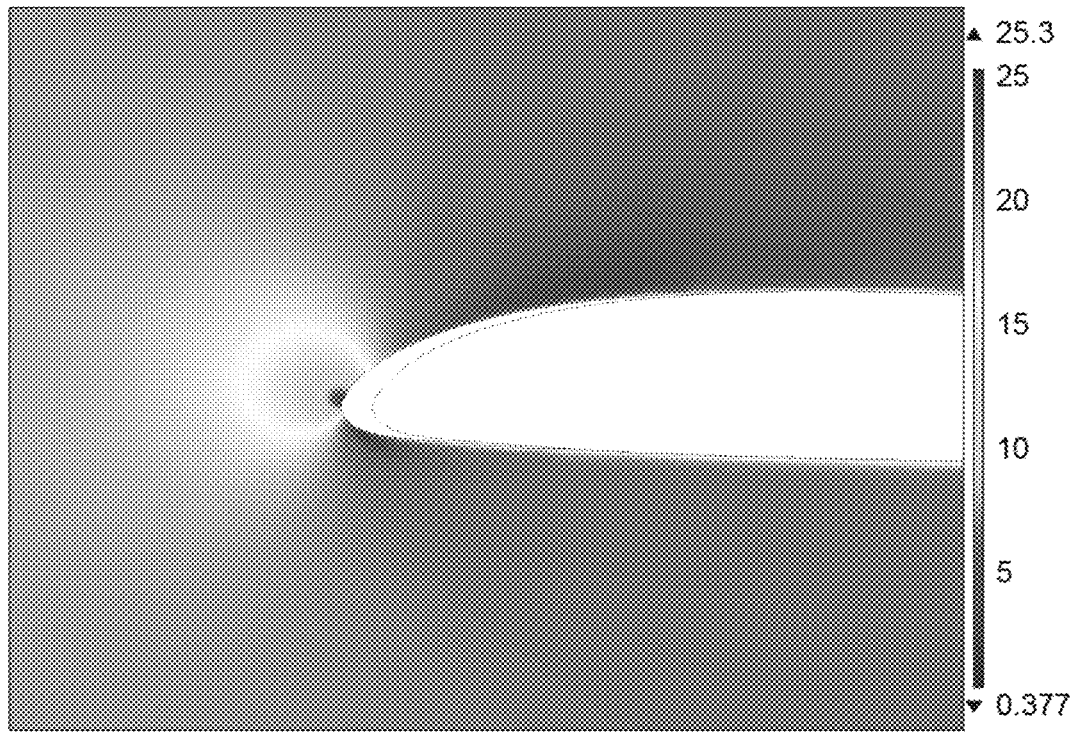

FIGS. 4A and 4B show the simulation environment with an ice layer applied to the leading edge of an aerofoil of the X8 Skywalker. The X8 Skywalker is a UAV that is a commercially available for civilian applications. See, for example: www.fpvmodel.com/latest-version-skywalker-black-x8-flying-wing-_g632.html (as viewed on Oct. 8, 2016). The X8 Skywalker is a UAV that the icing control system according to embodiments can be integrated into in order to improve the performance of the UAV in icing conditions.

FIG. 4A shows the airflow distribution around the X8 Skywalker's aerofoil. FIG. 4B is a close up view of the leading edge of the aerofoil and shows the applied ice layer.

Figure 5:
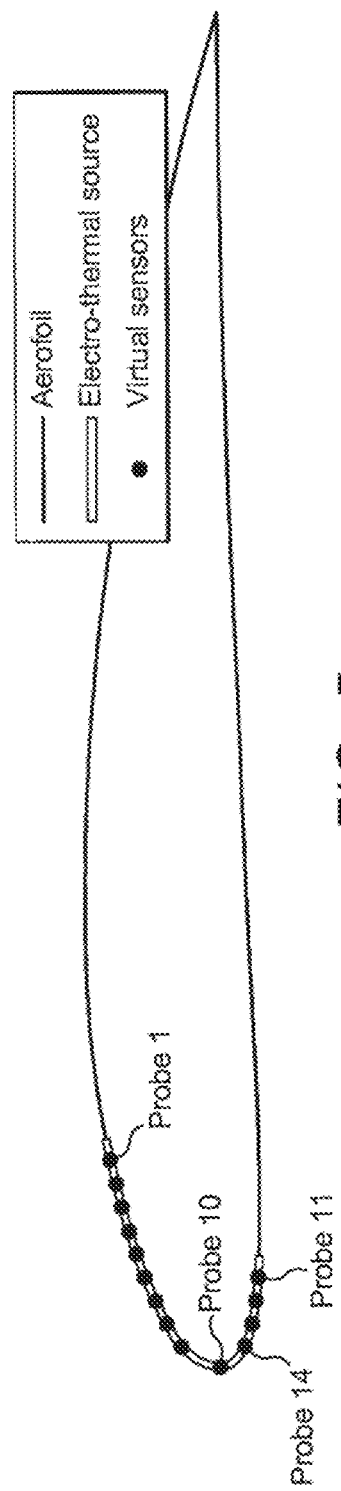
FIG. 5 shows probe locations on an aerofoil according to an embodiment.

To obtain temperature measurements over the area of the electro-thermal source, probes (i.e. virtual sensors) are embedded in the aerofoil, covering the physical extent of the electro-thermal source. Their locations are provided in Table 1 and shown in FIG. 5. In Table 1, the location is expressed by 'a' for 'atop' (i.e. on the top surface) or 'u' for 'under' (i.e. on the bottom surface) and by the chord line length from the leading edge of the aerofoil.

TABLE 1

| Probe No. | Chord Line Length (mm) | Location (a/u) |
|---|---|---|
| [1, 9] | [45.00, 5.00] | a |
| 10 | 0.00 | — |
| [11, 14] | [20.00, 5.00] | u |

While for the purposes of icing detection measuring the air temperature may be effective, the temperature of the aircraft surface is an acceptable proxy. Positioning the sensors to measure the temperature of the aircraft surface, rather than the surrounding air, allows for more accurate temperature control in anti-icing and de-icing modes. Thus, positioning the sensors on/in the aircraft surface means that only one set of sensors is required for both icing detection and anti-icing/de-icing control.

Figure 6:
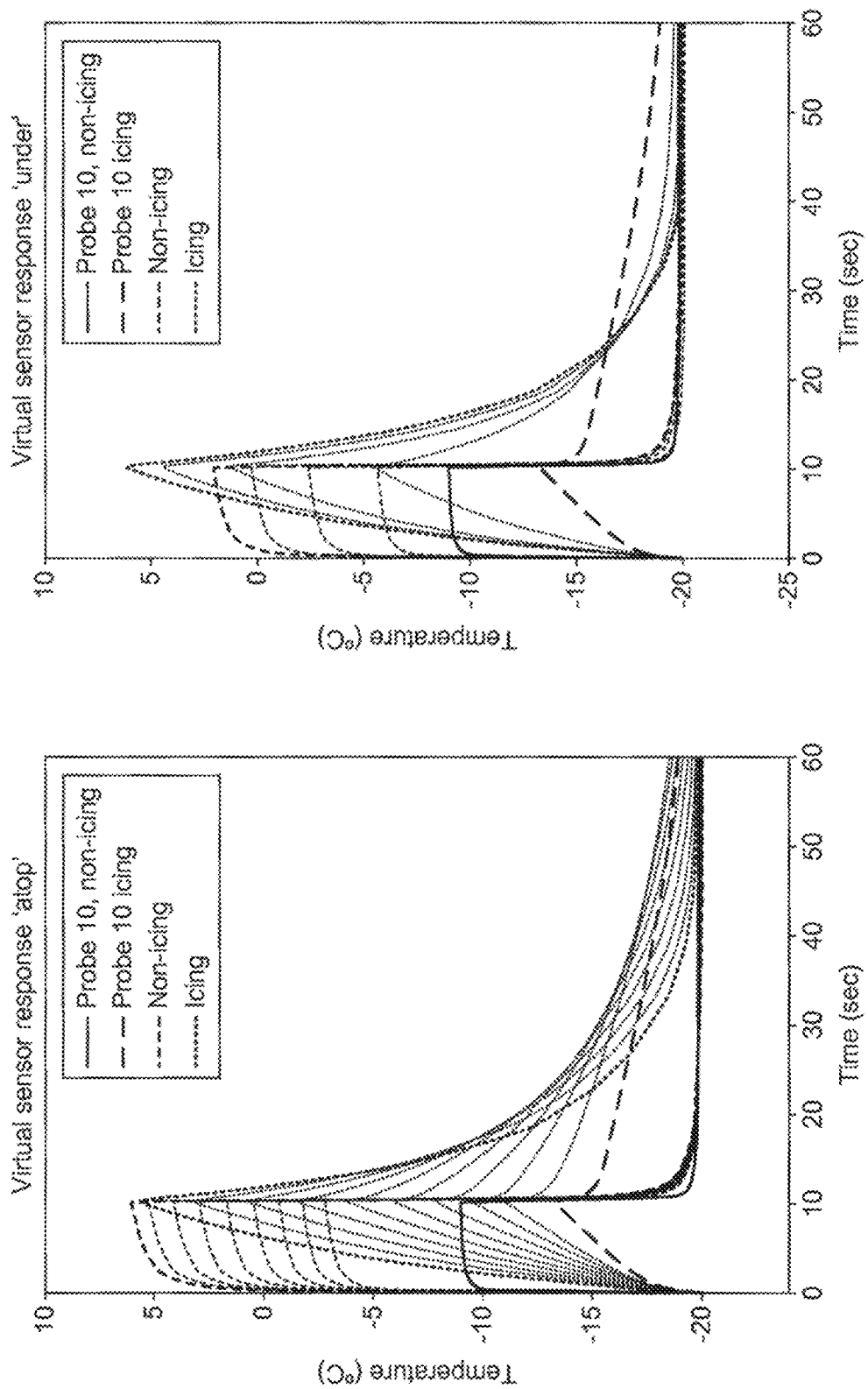
FIG. 6 shows simulations of temperature profiles.

The results of the simulations are shown in FIG. 6. Of the responses shown in FIG. 6, the responses form probes 1, 2 and 3 when obtained from simulations conducted in icing conditions show a different type of behaviour from the other sensors. This is because the icing layer did not cover these three specific probes. Modelling not all of the virtual sensors being covered with the ice layer was appropriate as it models a likely circumstance in actual icing conditions. Aside from these three deviating virtual sensor responses, there are clear thermal patterns in the data. The most relevant is a comparison of the profile of each response when in icing and in non-icing conditions. These temperature profiles clearly show the impact of the ice layer on the thermal time constant. Another characteristic that can be seen in the data is the temperature deviation of the virtual sensor located at the very leading edge, to the rest of the sensors.

Figure 7:
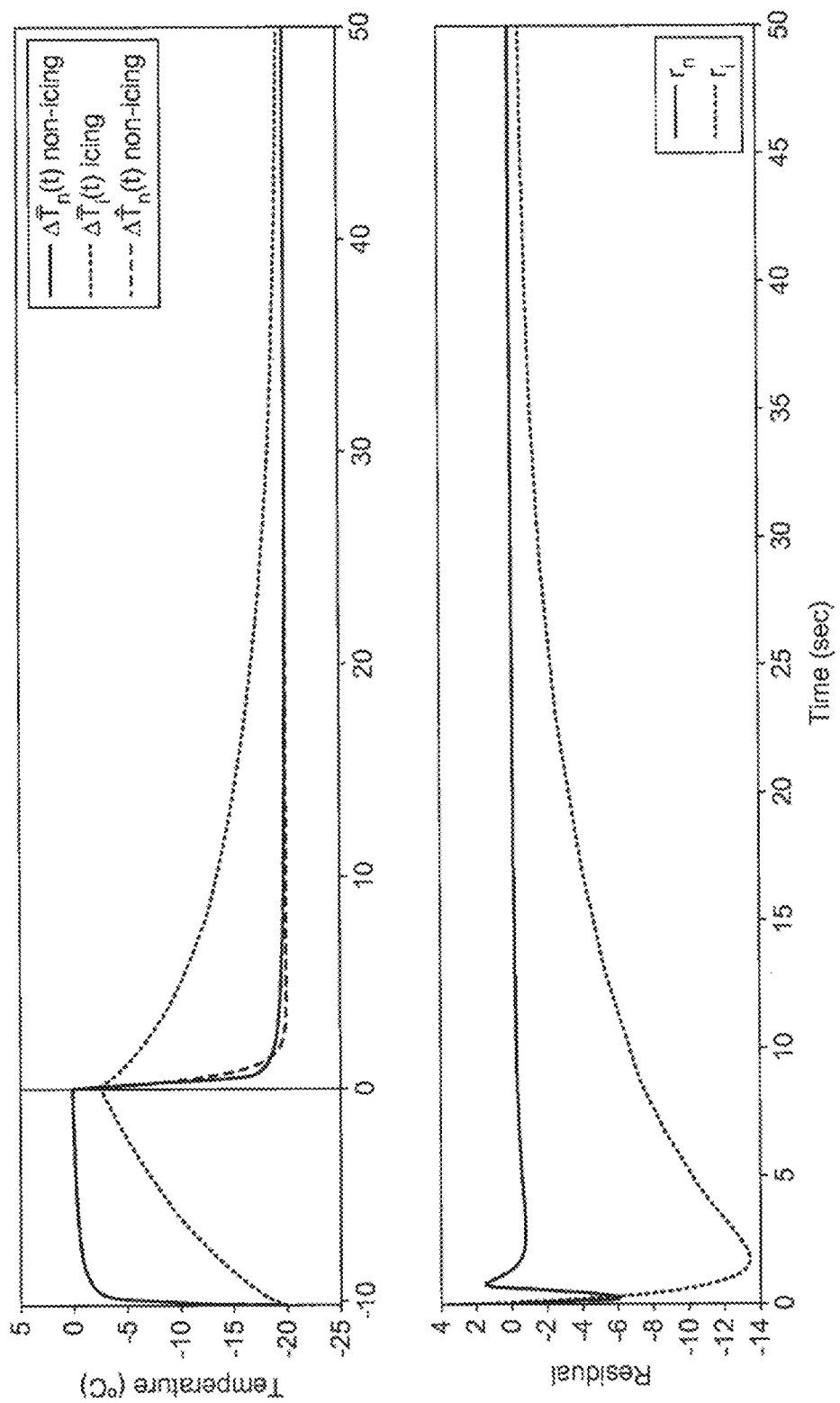
FIG. 7 shows a simulation of signals for detecting the presence of icing.

FIG. 7 shows simulated responses of the average temperature for datasets obtained in non-icing and icing conditions. The figure also shows the simulated residual signal.

The response denoted $\Delta T_n(t)$ is the average electro-thermal source temperature for simulations conducted for non-icing conditions, while the response identified by $\Delta T_i(t)$ shows the average temperature of the electro-thermal source for simulations conducted for icing conditions. $\Delta \hat{T}_n(t)$ is the response of the expression found in Eqn. 6 with the thermal constant determined by Eqn. 4. This latter response serves as a reference of the temperature profile for non-icing conditions. The two signals $r_n$ and $r_i$ denote the residual signal for non-icing and icing conditions, respectively.

The temperature profile for when no icing has occurred may be a predetermined profile that is permanently stored and used for all icing detection measurements. The predetermined profile may be the same for all of the specific type of UAV with the specific electro-thermal source and temperature sensor arrangements. Alternatively, the predetermined temperature profile may be determined for each specific UAV by measuring the temperature profile in non-icing conditions and then storing this profile. However, a preferred implementation is for the temperature profile to be measured for each flight by the UAV by measuring the temperature profile at the start of the flight as it is known that at this time substantially no icing has occurred. The measured temperature is then stored and re-used later as the temperature profile for when no icing has occurred.

In FIG. 7, it is clear that the residual has a very different characteristic when icing has occurred and can therefore be used to detect icing. For example, an algorithm may determine that icing has occurred if the average magnitude of the residual, in the time period between 2 seconds after heating has stopped and 5 seconds after heating has stopped, is greater than or equal to 0.5, and that icing has not occurred if the average magnitude of the residual, in the time period between 2 seconds after heating has stopped and 5 seconds after heating has stopped, is less than 0.5. These detection criteria are exemplary and embodiments include many other icing detection criteria based on measured temperatures, and/or a measured temperature profile being used. For example, the determination that icing has occurred may be made in dependence on a comparison with one or more reference profiles of responses when icing has or has not occurred. Reference profiles may be generated from previously measured data for the aircraft or theoretically calculated data.

Embodiments also include using any of the above techniques to further estimate how thick the ice layer is when icing has occurred. An estimation of the thickness of the ice layer is obtained from the gradient/shape of the temperature profile, the temperature profile being dependent on the thickness of the ice layer.

A preferred implementation is for separate electro-thermal sources to be provided on the leading edges of each wing of a UAV. Each electro-thermal source is provided in the surface of a wing.

Preferably, each electro-thermal source is a layer of Carbon material as described earlier in the present document. Preferably each electro-thermal source is integrated within the wing, the wing itself having a laminate structure and being made from Carbon fibre.

The most appropriate time periods and powers to operate each electro-thermal source arranged on a surface of a UAV are dependent on the type of UAV, which surface of the UAV the electro-thermal source is arranged on and the specific arrangement of the electro-thermal source on the surface.

However, the length of time for which the electro-thermal source is heated is preferably in the range 1 to 15 seconds, and more preferably loss than 10 seconds. The applied power to the electro-thermal source is preferably in the range 1000 W to 10000 W for each 1 $m^2$ of the surface that is covered by the heating element.

Preferably, there are temperature sensors arranged on and/or in the surface of each wing that cover the region of the wing that is heated by the electro-thermal sources. The temperature profile is preferably based an average of some, or all, of the temperatures of the plurality of temperature sensors as the surface of the wing cools.

Preferably, the temperature of the surface is also measured when the surface is being heated. The determination if icing has occurred on the surface can then be dependent on measured temperatures of the surface when the surface is heated as well as when the surface cools. Although an accurate determination can be made based on temperature data as the surface cools alone, this embodiment allows a determination to be based on more measured temperature data.

Embodiments also include providing a plurality of electro-thermal sources in a same wing with each electro-thermal source arranged to heat a different part of the surface of the wing. By operating separate icing detection processes for each electro-thermal source, a determination can be made of which surfaces of the wing icing has occurred on. This allows efficient anti-icing or de-icing to be performed as only the surfaces of the wing on which icing has occurred need to be heated. In addition, if icing is detected on surfaces heated by a plurality of electro-thermal sources, the electro-thermal sources are preferably sequentially heated, either individually or in groups, so that power is not supplied to all of the electro-thermal sources at the same time. Advantageously, this lowers the peak instantaneous power that the power source of the electro-thermal sources has to provide to the electro-thermal sources and allows for easier implementation and more efficient operation of the power source.

Embodiments also include applying the techniques as disclosed in K. L. Sørensen A. S, Holland, T. A. Johansen; 'Carbon nanomaterial-based wing temperature control system for in-flight anti-icing and de-icing of unmanned aerial vehicles'; 2015 IEEE Aerospace Conference; 7-14 Mar. 2015; Pages: 1-6; ISSN:1095-323X; Print ISBN:978-1-4799-5379-0, the entire contents of which are incorporated herein by reference.

Embodiments also include applying the techniques as disclosed in K. L. Sørensen A. S, T. A. Johansen; 'Thermodynamics of a Carbon nano-materials based icing protection system for unmanned aerial vehicle'; 2016 IEEE Aerospace Conference; 5-12 Mar. 2016; pages; 1-10; INSPEC Accession Number:16121843, the entire contents of which are incorporated herein by reference.

Embodiments of the invention that provide the new Self-Calibrating Air Data Parameter Estimator component, that is more generally an air data estimation component, for the model-based icing detection algorithm for detecting icing are described in more detail below.

Large aircraft with human pilots are often equipped with air data parameter sensors, such as vanes and multi-hole pilot probes. However, it is not practical to provide such equipment on UAVs, in particular small UAVs, due to the strict restrictions on size, weight, power consumption, and price.

Embodiments solve this problem by providing an air data parameter estimation system that only requires measurements that are obtainable for a UAV through a combination of standard sensor suite measurements and small sensors embedded in the surface of the UAV. The model-based technique according to embodiments is based on a combination of a machine learning algorithm, preferably a neural network (NN) algorithm, together with air data parameter state estimators.

Advantageously, embodiments provide an accurate, robust and low-cost method of estimating the air data parameters for a UAV. The techniques according to embodiments are particularly appropriate for UAVs but may also be applied to other aircraft than UAVs.

Embodiments provide a two layered approach to estimating air data parameters. The first layer is the application of a machine learning algorithm. The second layer is the application of one or more state estimation algorithms that operate on the outputs of the machine learning algorithm. Compared to an air data parameter state estimator, the ML approach is normally associated with higher accuracy, but comes with the weakness of being sensitive to structural changes in the sensor setup. If one sensor output changes slightly due to wear or a tiny change in position/alignment of sensor, the output of the ML component can potentially degrade a significant amount.

The machine learning algorithm maps a pressure distribution, and preferably also a temperature distribution, over the UAV to air data parameters. The ML component is trained using data that contains information on these input-output relations and approximates the underlying unknown mathematical function from input to output, so that the ML component is capable of providing a set of air data parameter estimates if given a set of pressure measurements. A particularly preferred embodiment is for the machine learning algorithm to be a neural network and embodiments are presented herein with the machine algorithm being a neural network. The method has been tested using two different ML algorithms, artificial neural networks (NNs) and linear regression (LR). However, embodiments include the use of any parameter estimation algorithm capable of mapping pressures and/or temperatures over the UAV to air data parameters. For example, embodiments include the use of genetic algorithms, logistic regression and support vector machines.

A plurality of pressure and/or temperature sensors are positioned over, and embedded in the external surface of the UAV. An advantage of embodiments is that there is a lot of flexibility in the sensor placement and so embodiments can be used with a large range of sizes and designs of UAV. Depending on the subject aircraft of implementation, this potentially allows equipping a UAV with an air date parameter estimator system, where other solutions are not viable. An example could be a UAV that is driven by a propeller on the nose of the aircraft, which denies use of a nose flush air data sensing (FADS) system. The wide range of possible layouts of the solution can be chosen to accommodate the exact needs of the UAV it is designed for.

In addition, each specific sensor arrangement on each specific design of UAV will preferably be provided with a new set of training data for the neural network. Advantageously the below described second layer of the air data parameter estimation technique corrects the small inaccuracies between individual UAVs with the same design and sensor arrangement. There is therefore no need to individually calibrate each individual UAV and techniques according to the embodiments are therefore highly scalable.

Each sensor is preferably a MEMS-based Piezo-resistive pressure sensor. An example of a particularly preferably sensor is the Bosch280: www.bosch-sensortec.com/bst/products/all_products/bmp280 as viewed on 16 Aug. 2016. This is a combined pressure and temperature sensor that has a low cost, small size and low power consumption. This type of sensor can be used with small UAVs, whereas large and expensive pitot probes cannot. It can be connected to a microcontroller, for example via an SCSI (small computer system interface) parallel interface (SPI). Wire-based communication relieves the setup of rubber tubes connected to an expensive pressure scanner.

A positioning of the sensors over the surface of the UAV according to an embodiment is four sensors on the top of each wing, one sensor on the bottom of each wing, three sensors on the top of the nose of the UAV, two sensors on the front-sides of the nose of the UAV and one sensor on the bottom of the nose of the UAV. The positioning of the sensors is therefore strategically chosen so that sensors are provided in the most appropriate locations for measuring temperatures and/or pressures.

The training data for the neural network may be obtained from one or more of measured data in a wind tunnel, measured data during actual flights or from software simulations, for example created using computational fluid dynamic (CFD) software or panel method software. In wind tunnel testing, using a pan-tilt unit (PTU) enables variation of AOA and SSA. This allows for a fast collection of data points and can produce data on the dynamic transition between PTU positions. Software simulation can produce large data sets since many different parameters can be adjusted (air data parameters, temperature, air density etc.).

The inputs to the neural network preferably have little filtering and a high update rate. Although this will, at least initially, result in less accurate estimates by the neural network, it will provide the basis for more accurate estimates in highly dynamic flight conditions.

The output of the first layer neural network component is an estimate of the air data parameters of the UAV. This output is provided to the second layer of the air data parameter estimation technique according to embodiments, that automatically applies a calibration to the air data parameter estimates. Any inaccuracies in the sensor outputs due to wear or applying the sensor set-up to a UAV that the neural network was not specifically trained for are advantageously compensated for by the applied calibration by the second layer to thereby provide a robust and fault tolerant system.

Preferably, the first layer algorithm implements a further, separate, neural network in addition to that for providing the main air data estimates as described above. The further neural network is configured to detect whether the sensor measurements are coherent with respect to each other and to exclude any faulty sensor readings. This allows the training of a number of new individual neural networks to handle the situation in which there is a specific loss of a sensor. For example, if one of the sensors starts outputting measurements that are estimated to be faulty, a network is trained using the other sensors and is used for air data parameter estimation instead.

The second layer of the air data parameter estimator system can be a signal-based or model-based observer. According to embodiments it is a state estimator component structure. This component consists of one or more state estimation algorithms running simultaneously that filter the neural network component estimates by using a mathematical model of the UAV, and optionally sensor measurements, to correct any inaccuracies of the neural network component estimates. The state estimator can either be combined with the ML component by a frequency-based addition of the signals, or by having the state estimator component treating the ML component as a virtual air data parameter sensor.

If there are conditions where it is known that the neural network component does not provide good air data estimates, the state estimation component is preferably configured to obtain estimates of the air data parameters by using a different state estimation algorithm that does not utilise the neural network component estimates. This provides a complete air data parameter estimation system that is capable of handling any situation that a UAV may experience.

Figure 8:
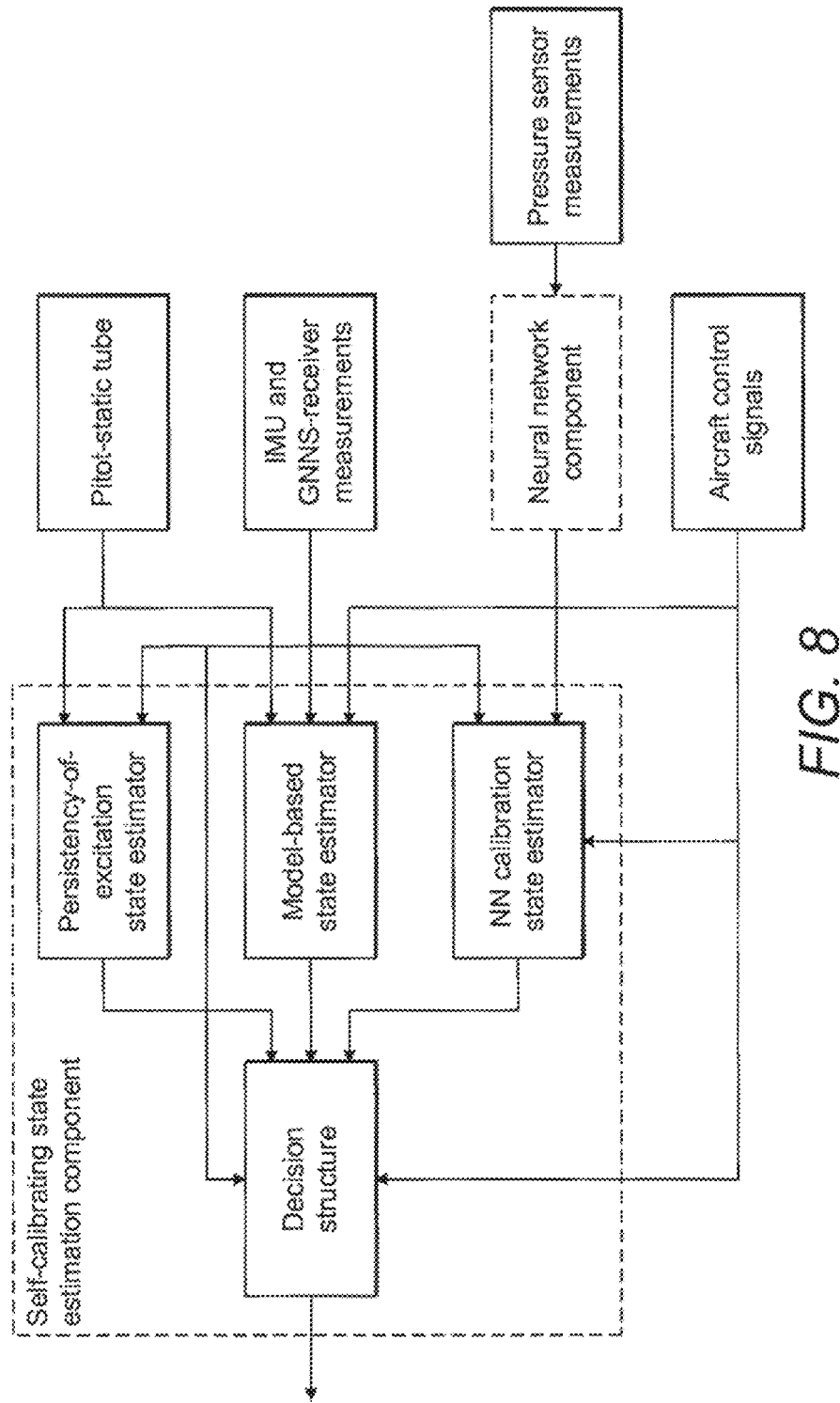
FIG. 8 is a block diagram of an embodiment of an air data parameter estimation system.

A block diagram of an embodiment of the air data parameter estimation system is shown in FIG. 8. A number of different state estimators are provided in parallel and the different state estimators may operate simultaneously. Embodiments also include the use of other state estimation algorithms for obtaining estimates of the air data parameters further to those specifically shown in FIG. 8.

The inertial measurement unit (IMU), global navigation satellite system (GNNS) receiver, and differential pressure pitot-static probe are provided as a sensor suite on a UAV. Note that the differential pressure pitot-static probe only provides a relative velocity measurement in the forward direction of the UAV. The air data estimation system of embodiments obtains air data estimates in all three dimensions.

In FIG. 8, the Persistency-of-Excitation State Estimator component preferably estimates air data parameters by implementing the techniques as disclosed in Johanson, T. A., Cristofaro. A., Sørensen, K. L, Hanson, J. M., & Fossen. T. I. (2015, June); 'On estimation of wind velocity, angle-of-attack and sideslip angle of small UAVs using standard sensors'; in 2015 international conference on unmanned aircraft systems (icuas); (pp. 510-519). IEEE, the entire contents of which are incorporated herein by reference. The Persistency-of-Excitation State Estimator component is an observer component that requires only standard sensors and does not rely on a mathematical model of the aircraft. Although the observer component does require a flight pattern that is consistently excited, the excitation arising from the environment and normal flight envelopes is sufficient. Furthermore, implementing the ML component as a virtual sensor removes this requirement.

The Persistency-of-Excitation State Estimator component further preferably estimates air data parameters by implementing the techniques as disclosed in A. W. Wenz, T. A. Johansen, A. Cristofaro; 'Combining model-free and model-based Angle of Attack estimation for small fixed-wing UAVs using a standard sensor suite'; 2016 International Conference on Unmanned Aircraft Systems (ICUAS); 7-10 Jun. 2016; Page(s): 624-632; the entire contents of which are incorporated herein by reference. This state estimator also includes a lift coefficient estimation.

In FIG. 8, the Model-Based State Estimator component preferably estimates air data parameters by implementing the techniques for estimating air data parameters as disclosed in K. L. Sørensen, M. Blanke, T. A. Johansen; 'Diagnoses of Wing Icing Through Lift and Drag Coefficient Change Detection for Small Unmanned Aircraft'; IFAC Safeprocess'15—Paris, France; Volume 48; Issue number 21; Pages 541-546; ISSN: 1474-6670, or Borup, K. T., Fossen, T. I., & Johansen, T. A. (2016) 'A Nonlinear Model-Based Wind Velocity Observer for Unmanned Aerial Vehicles In Non-linear control systems (nolcos)', the entire contents of which are incorporated herein by reference. This relies on a mathematical model of the UAV, a standard sensor suite, and the aircraft control signals. There is no restriction on flight pattern with res poet to excitation of this estimator.

In FIG. 8, the NN Calibration State Estimator component is a model-based state estimator that receives the neural network component air data parameter estimates as inputs. This state estimator uses measurements from the UAV sensor suite along with the aircraft control signals. In particular, the NN Calibration Stale Estimator may use the specific control signals of thrust and deflection angles. These can be either commanded or measured. The state estimator functions as a filter for the neural network component air data parameter estimates. The resulting output is more accurate air data parameter estimates that include a self-calibration that corrects inaccuracies that are a consequence of changes in pressure sensor setup (such as small structural differences that occur when installing the pressure sensors on a new UAV).

In FIG. 8, the Decision Structure component receives as inputs the outputs of the state estimators and determines to generate a state estimate, that is an estimate of the air data parameters, as its output in dependence on one or more of the received inputs, the determination being dependent on the input data and the current flight trajectory of the UAV. The output air data parameters from the Decision Structure component may be the same as one of the received inputs of the Decision Structure component, the determination by the Decision Structure component being only to select which of the received air data parameters to output given the current flight conditions.

Embodiments therefore advantageously obtain air data parameter estimates by one of a plurality of techniques that include the new technique of combining machine learning or parameter estimation techniques with observer theory-based state estimation algorithms. This provides self-calibration for small structural changes between individual sensor set-ups and reduces the effect of any errors caused by minor sensor degradation. Embodiments are highly scalable and allow for flexible placement of the pressure/temperature sensors.

A possible augmentation of the method is adding a third layer to the estimator structure (before or incorporated into the Decision Structure). This could consist of a Kalman filter that takes any number of air data parameter estimators as input and treats the input as Wiener processes, white nose, or Markov models. This method allows for a modular approach to estimating the air data parameters where any number of combinations of the above mentioned estimators can be combined into a single output structure, where specifics of the Kalman fitter is chosen based on the performance characteristics of the input estimators. For example, a sensor-based air data parameter estimator and a self-calibrating air data parameter estimator could both be connected to a third layer Kalman filter that in turn produces the final output of the augmented system. This structure could consist of any number of different configurations, e.g. the self-calibrating air data parameter estimator in parallel with two model-based estimators and three sensor-based estimators into the third layer Kalman filter.

Figure 9:
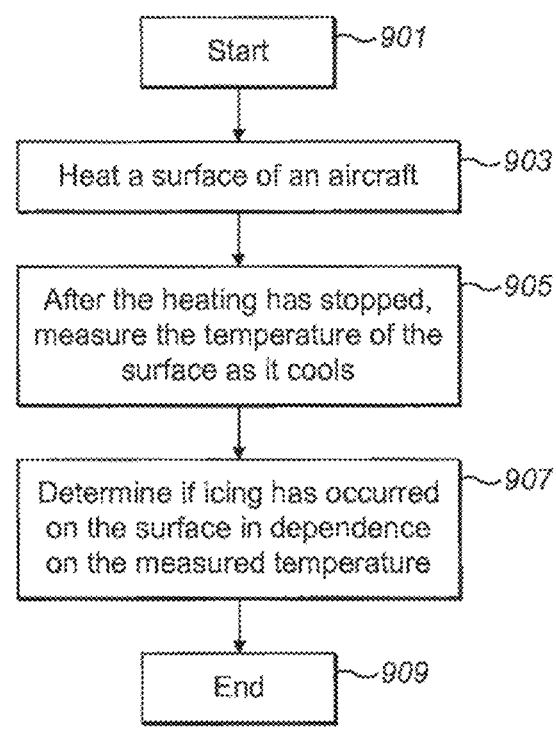
FIG. 9 is a flowchart according to an embodiment.

FIG. 9 is a flowchart that shows a process for determining if icing has occurred on a surface of an aircraft according to an embodiment. In step 901, the process begins. In step 903, the surface of an aircraft is heated. In step 905, the temperature of the surface is measured as it cools, after the heating has stopped. In step 907, a termination is made if icing has occurred on the surface in dependence on the measured temperature. In step 909, the process ends.

The icing control system according to embodiments comprises a computing system for implementing all of the algorithms and other processes according to embodiments. In particular, methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

Embodiments include a number of modifications and variations to the embodiments as described above.

As described above, embodiments preferably implement both a model-based icing detection algorithm and an electro-thermal-based detection algorithm. The use of two algorithms increases the robustness and reliability of the system. However, embodiments include an icing control system that implements only one of these algorithms.

Embodiments can be used to detect and/or prevent icing on any surface of an aircraft. These include any of aircraft's wings, rotary wings, stabilisers, propellers, rotors, exposed measurement instruments (such as pilot tubes) and antennas.

Embodiments include the use of more than one power source. For example, the power source that is used to heat the electro-thermal sources may be separate from that used to power the processing by the icing control system.

The control unit as shown in FIG. 1 may comprise more than one of any of the shown blocks. For example, there may be a respective and separate block for implementing an electro-thermal-based detection algorithm for each of a plurality of electro-thermal sources arranged in the aircraft.

The central fault diagnosis algorithm as shown in FIG. 1 is configured to detect faults that are related to icing. Embodiments also include this component detecting all faults that may occur, not only those related to icing. An example of a non-icing fault is the loss of a sensor measurement icing is therefore just one of a plurality of faults that can be mitigated, or prevented by the control system.

Embodiments also include using the machine learning component that is preferably a neural network for other applications. The air data parameter estimation system of embodiments provides accurate measurements in three dimensions. However, this may not be necessary for certain applications. For an icing detection technique, AOA and airspeed estimates may be made during cruise immediately after take-off, and then a change detection algorithm may be run on these values continuously after the UAV transitions into unknown flight conditions that could result in icing.

This results in estimate biases and inaccuracies cancelling out and thereby providing a simple means for detecting icing. In this embodiment, the machine teaming component is capable of functioning as a standalone algorithm with its output directly connected to an icing detection algorithm.

Embodiments are particularly appropriate for implementation in UAVs, more particularly in small UAVs. However, embodiments are also applicable to other aircraft, including standard human piloted aircraft.

Embodiments include the use of any other type of electro-thermal source form that described above. Embodiments also include there being no electro-thermal source and the electro-thermal-based detection algorithm operating to detect icing after heating has been performed by an alternative heating source. For example, if the aircraft has a jet engine, the heating may be performed by temporarily applying heat from the jet engine over the surface on which icing is to be detected.

Embodiments include the icing detection and icing control techniques being applied in other industries than aviation. Such industries include shipping, the icing prevention of towers in the communications industry and the power generation and transmission industry (e.g. icing prevention of wind turbines).

The low charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes substitutions, and alterations apparent to those skilled in the art can be made to the disclosed embodiments without departing from the spirit and scope of the invention as set forth in the appended claims.

The invention claimed is:

1. A method for detecting icing on a surface of an unmanned aerial vehicle (UAV), the method comprising:
receiving a first indication that icing has occurred from a first icing detection system, wherein the first icing detection system determines icing using an aerodynamic model for the UAV; receiving a second indication that icing has occurred from a second icing detection system, wherein the second icing detection system determines icing using a thermodynamic model for a surface component of the UAV, the thermodynamic model incorporating one or more electro-thermal sources beneath the surface; and determining that icing has occurred in dependence on the first indication and the second indication.

2. The method of claim 1, wherein the first icing detection system and the second icing detection system operate simultaneously and in parallel with each other.

3. The method of claim 1, wherein:
operation of the second icing detection system is started in response to the first icing detection system detecting icing; and icing is determined to have occurred in response to the second icing detection system detecting icing.

4. The method of claim 1, wherein operation of the first icing detection system is started in response to a determination that potential icing conditions are present, based on atmospheric sensor measurements.

5. The method of claim 4, wherein the atmospheric sensor measurements comprise ambient temperature and relative humidity measurements.

6. The method of claim 1, further comprising, in response to the second icing detection system detecting icing:
starting a de-icing mode in which the one or more electro-thermal sources are provided with a succession of short power bursts, each burst followed by a longer period where no power is supplied; or
starting an anti-icing mode in which the one or more electro-thermal sources heat the surface to maintain the surface temperature at a specified level above freezing.

7. The method of claim 1, wherein the first icing detection system receives inputs from external sensors, optionally including one or more of angular velocities, specific forces and engine speed measurements, as well as estimates of the angle-of-attack, side-slip angle and airspeed of the aircraft.

8. The method of claim 1, wherein the first icing detection system detects icing in dependence on a mathematical model of the UAV, the 15 method comprising:
receiving air data estimates of the UAV, wherein the air data estimates comprise the UAV's angle-of-attack, side-slip angle and airspeed; receiving external sensor measurement data for the UAV, wherein the external measurement data comprises data on the UAV's specific force, angular rate, magnetic field and engine speed; using the received air data estimates and external sensor measurement data to generate a model of the UAV; determining that icing has occurred on a surface of the aircraft in dependence on a comparison of the generated model with reference data.

9. The method of claim 1, wherein the second icing detection system detects icing by:
heating the surface component of the UAV;
after the heating has stopped, measuring the temperature of the surface component as it cools;
using measured temperatures as the surface component cools to obtain a temperature profile of the surface component as it cools; and
determining if icing has occurred on the surface in dependence on the obtained temperature profile.

10. The method of claim 1, wherein the one or more electrothermal sources comprise electrically conductive carbon materials arranged in a layer and integrated with a laminate composite structure in the surface of an aerofoil, a propeller or a rotary wing.

11. An icing control system comprising a computing system configured to perform the method of claim 1.

12. A UAV comprising the icing control system of claim 11.

* * * * *